(12) United States Patent
Jakubowicz et al.

(10) Patent No.: US 10,710,474 B2
(45) Date of Patent: Jul. 14, 2020

(54) PASSENGER SUPPORT

(71) Applicant: FAURECIA AUTOMOTIVE SEATING, LLC, Auburn Hills, MI (US)

(72) Inventors: Zenon Jakubowicz, Clawson, MI (US); Donald A. Sharnowski, Novi, MI (US); Angelo D. DiCicco, Royal Oak, MI (US); Michael P. Miller, South Lyon, MI (US); Thomas J. Cooley, Lapeer, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 79 days.

(21) Appl. No.: 16/084,318

(22) PCT Filed: Mar. 31, 2017

(86) PCT No.: PCT/US2017/025452
§ 371 (c)(1),
(2) Date: Sep. 12, 2018

(87) PCT Pub. No.: WO2017/173316
PCT Pub. Date: Oct. 5, 2017

(65) Prior Publication Data
US 2019/0070981 A1 Mar. 7, 2019

Related U.S. Application Data

(60) Provisional application No. 62/316,734, filed on Apr. 1, 2016.

(51) Int. Cl.
*F16M 13/00* (2006.01)
*B60N 2/08* (2006.01)
(Continued)

(52) U.S. Cl.
CPC ......... *B60N 2/0806* (2013.01); *B60N 2/0818* (2013.01); *B60N 2/0875* (2013.01);
(Continued)

(58) Field of Classification Search
CPC .... B60N 2/0806; B60N 2/929; B60N 2/0818; B60N 2/0875
(Continued)

(56) References Cited

U.S. PATENT DOCUMENTS

2010/0008606 A1* 1/2010 Craddock .............. B60N 2/929
384/26
2011/0037305 A1* 2/2011 Shao .................. B60N 2/01541
297/344.1
(Continued)

FOREIGN PATENT DOCUMENTS

WO 2010080593 A1 7/2010

OTHER PUBLICATIONS

PCT International Search Report and Written Opinion completed by the ISA/KR dated Jul. 25, 2017 and issued in connection with PCT/US2017/025452.

*Primary Examiner* — Todd M Epps
(74) *Attorney, Agent, or Firm* — Barnes & Thornburg LLP

(57) ABSTRACT

A passenger support includes a vehicle seat and a foundation frame having a lower track and an upper track. The lower track is coupled to a floor of a vehicle in a fixed position relative the floor. The vehicle seat is coupled to the upper track to slide back and forth relative to the lower track.

19 Claims, 13 Drawing Sheets

(51) Int. Cl.
  *B60N 2/12* (2006.01)
  *B60N 2/90* (2018.01)
(52) U.S. Cl.
  CPC ............ *B60N 2/0881* (2013.01); *B60N 2/12* (2013.01); *B60N 2/929* (2018.02)
(58) Field of Classification Search
  USPC ................ 248/429; 296/65.01, 65.13, 65.15
  See application file for complete search history.

(56) References Cited

U.S. PATENT DOCUMENTS

2013/0320178 A1* 12/2013 Harvey .................. B60N 2/085
  248/429
2013/0320729 A1* 12/2013 Cooley .................... B60N 2/06
  297/331

* cited by examiner

PASSENGER SUPPORT

CROSS REFERENCE TO RELATED APPLICATIONS

This application is a U.S. national counterpart application of PCT International Application Serial No. PCT/US2017/025452, filed Mar. 31, 2017 and claims the benefit of and priority to U.S. Provisional Patent Application Ser. No. 62/316,734, filed Apr. 1, 2016, the entire contents of each of which are expressly incorporated by reference herein.

BACKGROUND

The present disclosure relates to vehicle seats, and particularly to movable vehicle seats. More particularly, the present disclosure relates to motion-control mechanisms included in movable vehicle seats.

SUMMARY

According to illustrative embodiments, a passenger support includes a vehicle seat and a foundation frame. The foundation frame is configured to interconnect the vehicle seat to a floor of a vehicle to allow the vehicle seat to slide back and forth relative to floor.

In illustrative embodiments, the passenger support further includes a latch unit configured to selectively allow movement of the vehicle seat between a slid-back configuration, a slid-forward configuration, and an easy-entry configuration. The slid-back configuration may be used by a relatively tall passenger resting on the passenger support. The slid-forward configuration may be used by a relatively short passenger resting on the passenger support. The easy-entry configuration may be used to maximize an opening for passengers to enter or exit a rear passenger support located behind the passenger support.

In illustrative embodiments, the latch unit includes a comfort latch unit and an easy-entry latch unit. The comfort latch unit is configured to allow movement of the vehicle seat between the slid-back configuration and the slid-forward configuration. The easy-entry latch unit is configured to allow movement of the vehicle seat between slid-back configuration, the slid-forward configuration, and the easy-entry configuration.

In illustrative embodiments, the vehicle seat may only be moved to the easy-entry configuration when both the comfort latch unit and the easy-entry latch unit are disengaged. The easy-entry latch is further configured to block the vehicle seat from moving back to one of the slid-forward or slid-back configurations from the easy-entry configuration while the easy-entry latch unit is in the disengaged position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 5:
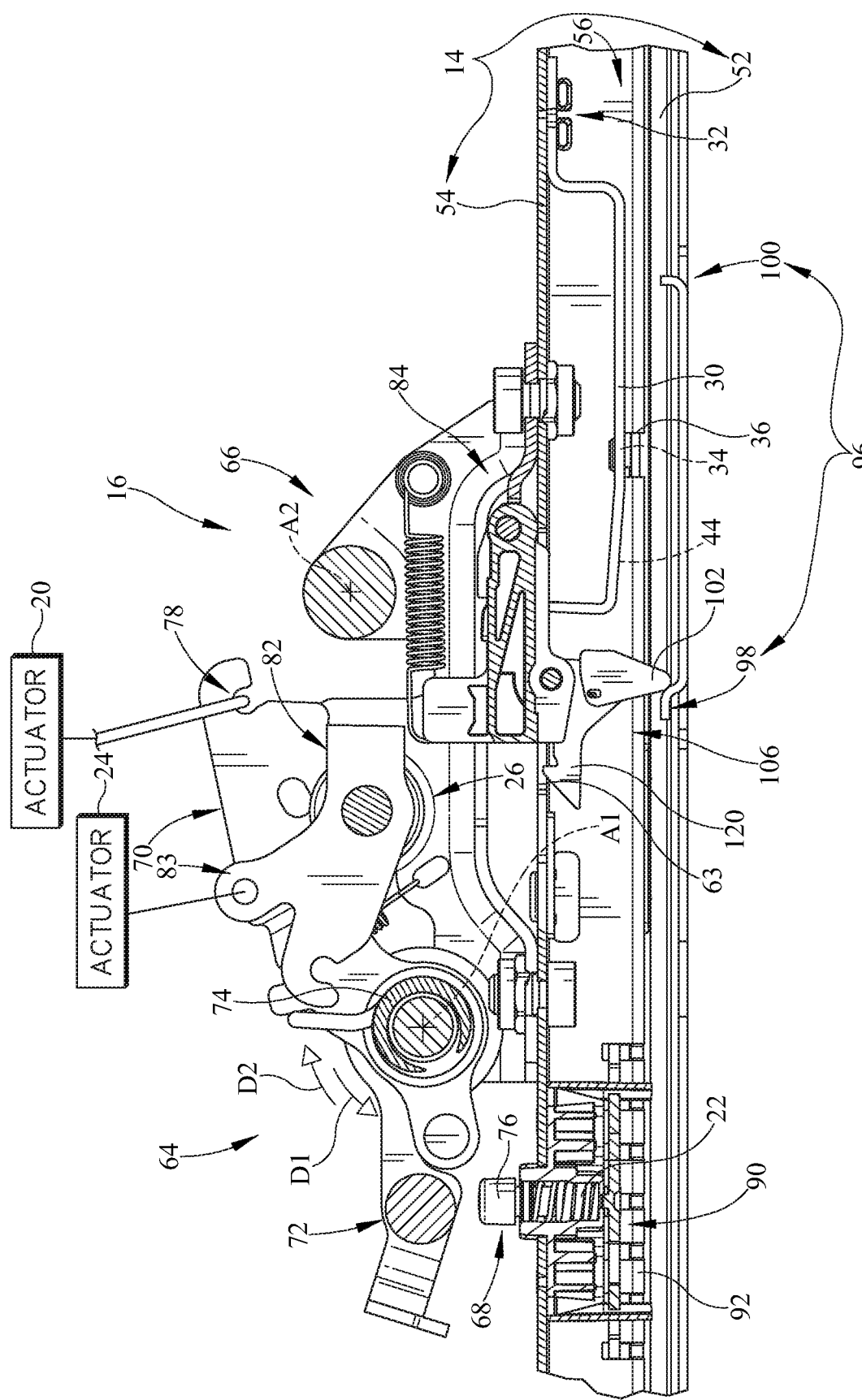
FIG. 5 is an elevational view of the latch unit of FIG. 4 with portions broken away to show the vehicle seat in the in the slid-back configuration and the comfort latch unit and the easy-entry latch unit is engaged positions limiting movement of the vehicle seat.
Figure 6:
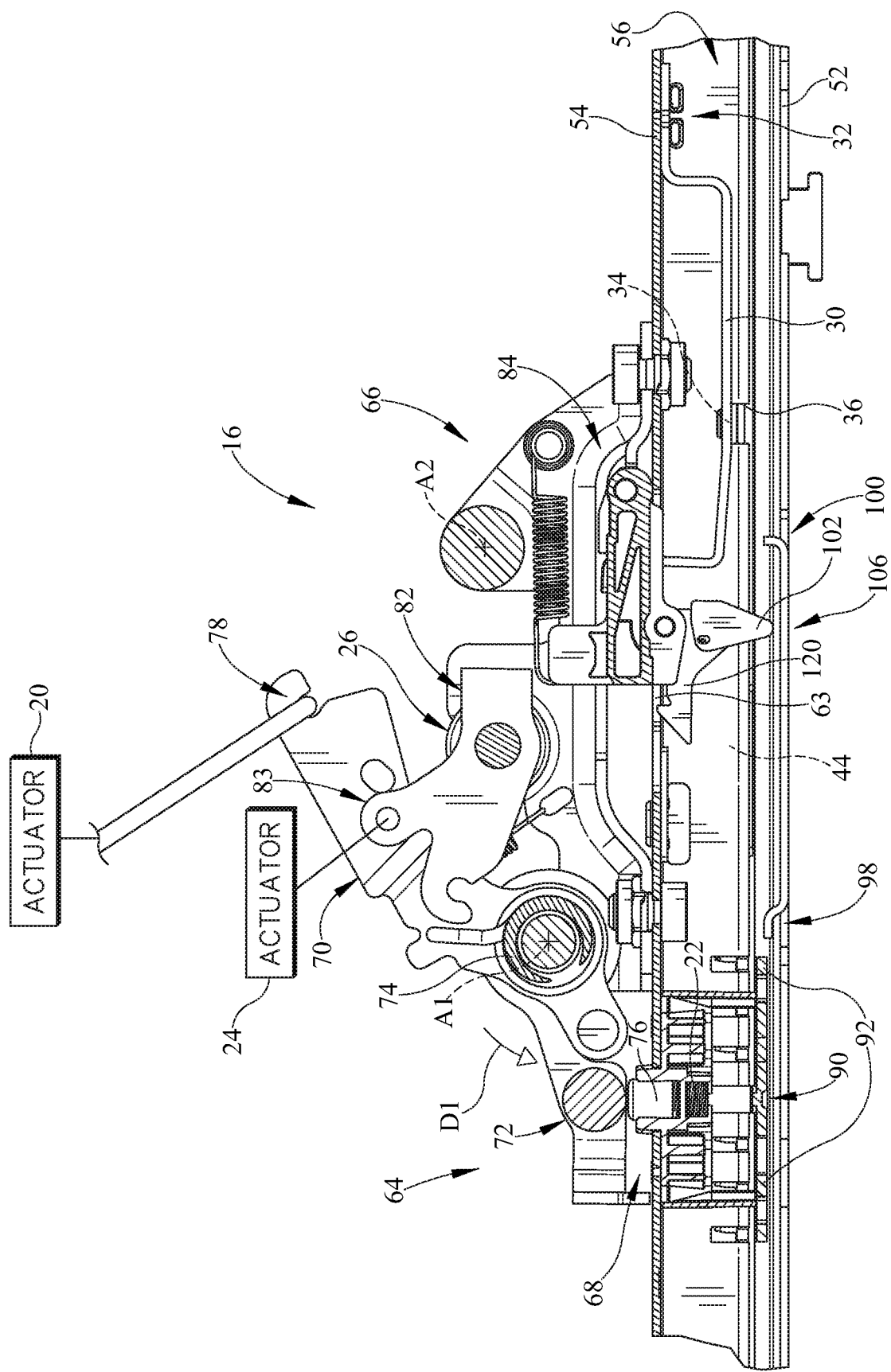

FIG. 6 is a view similar to FIG. 5 showing the easy-entry latch unit in the engaged position and the comfort latch unit in the disengaged position in which a button of a slide latch is moved downward to bias a body of the slide latch to release an upper track from a lower track to enable movement of the vehicle seat to slide only between the slid-back configuration and the slid-forward configuration.

Figure 4:
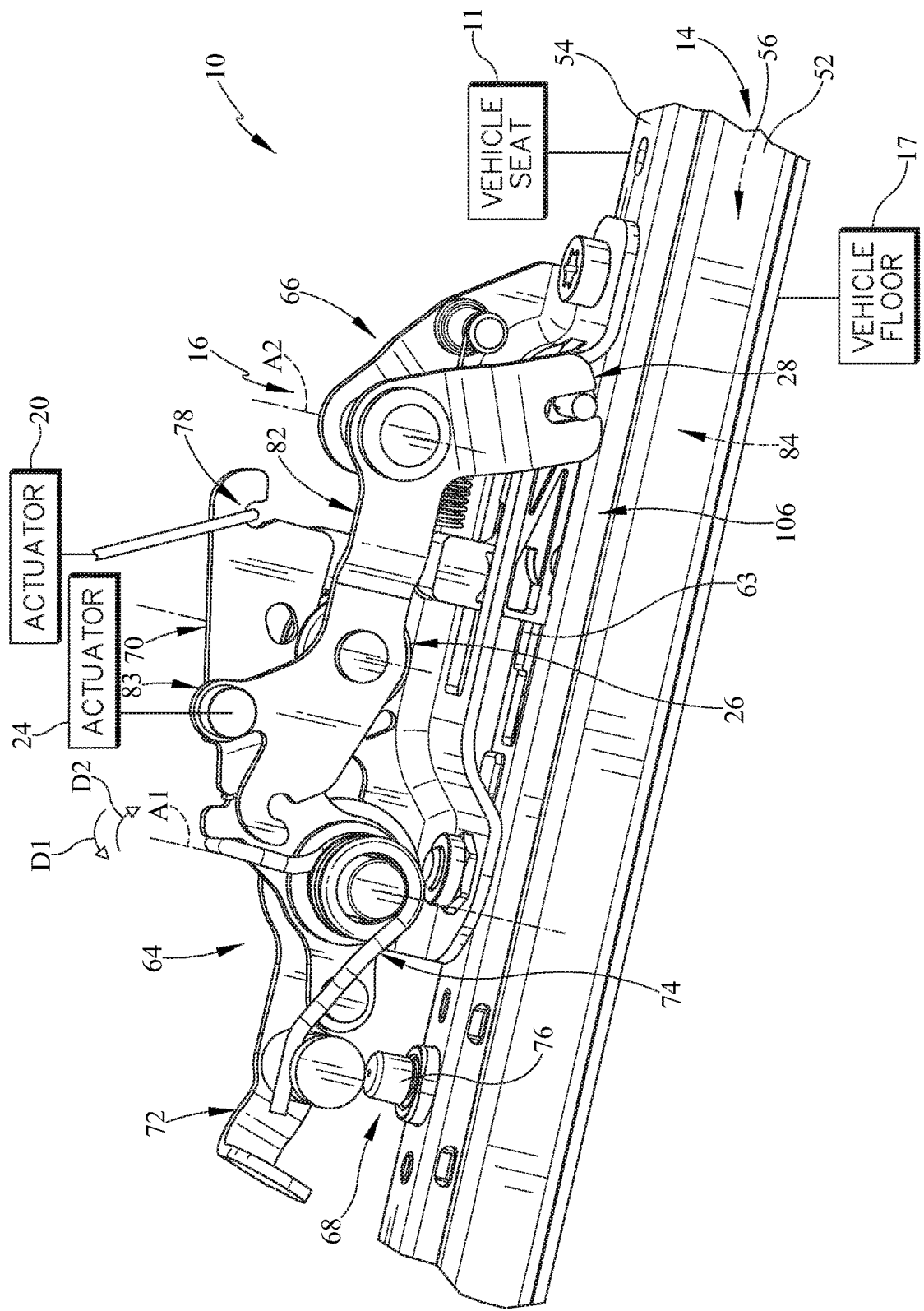
FIG. 4 is a partial perspective view of a latch unit included in the middle-row passenger seat showing that the latch unit includes a comfort latch unit to enable movement from the slid-back configuration to the slid-forward configuration and an easy-entry latch unit that enables movement from the slid-forward configuration to the easy-entry configuration.
Figure 7:
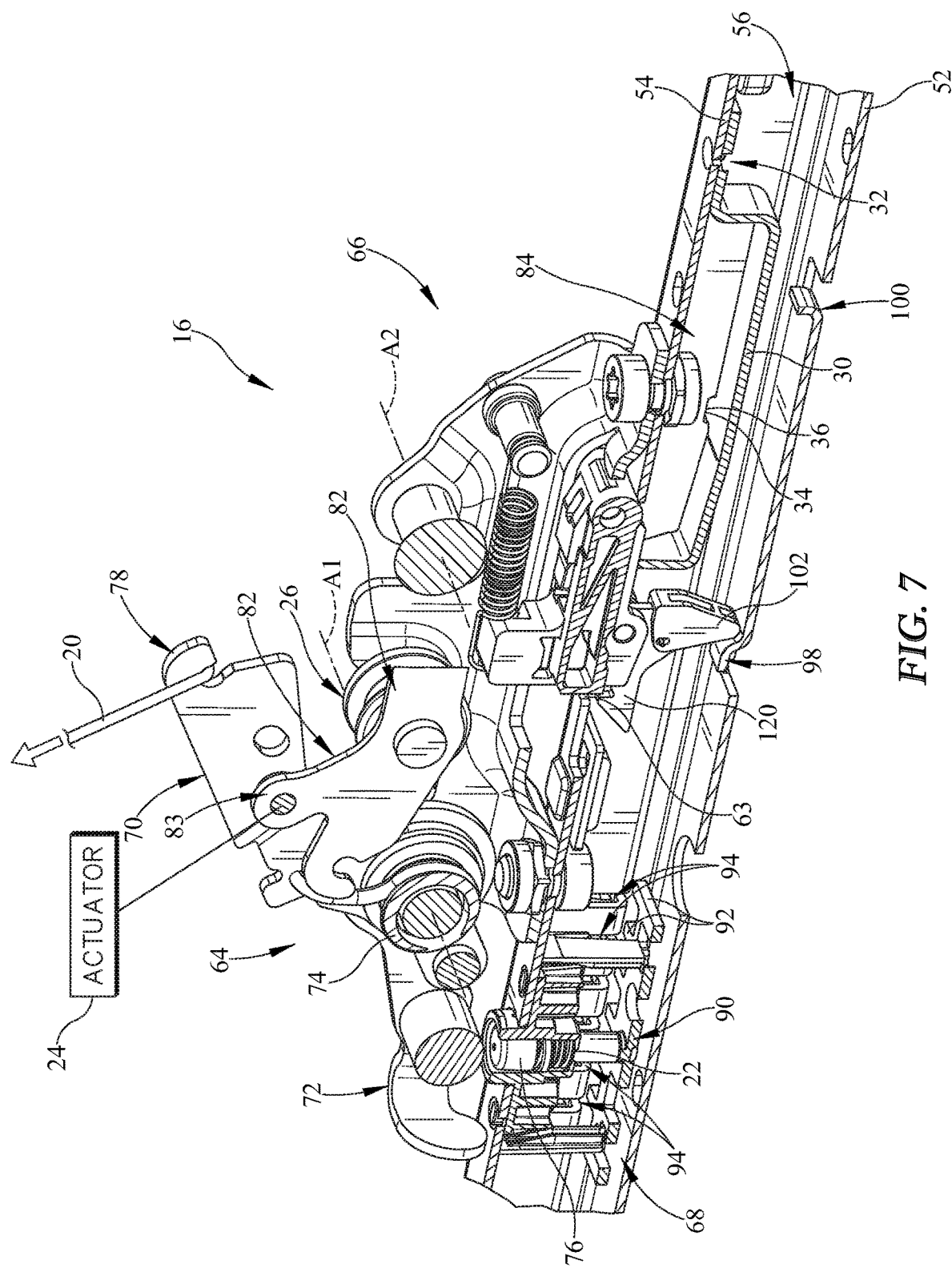
Figure 8:
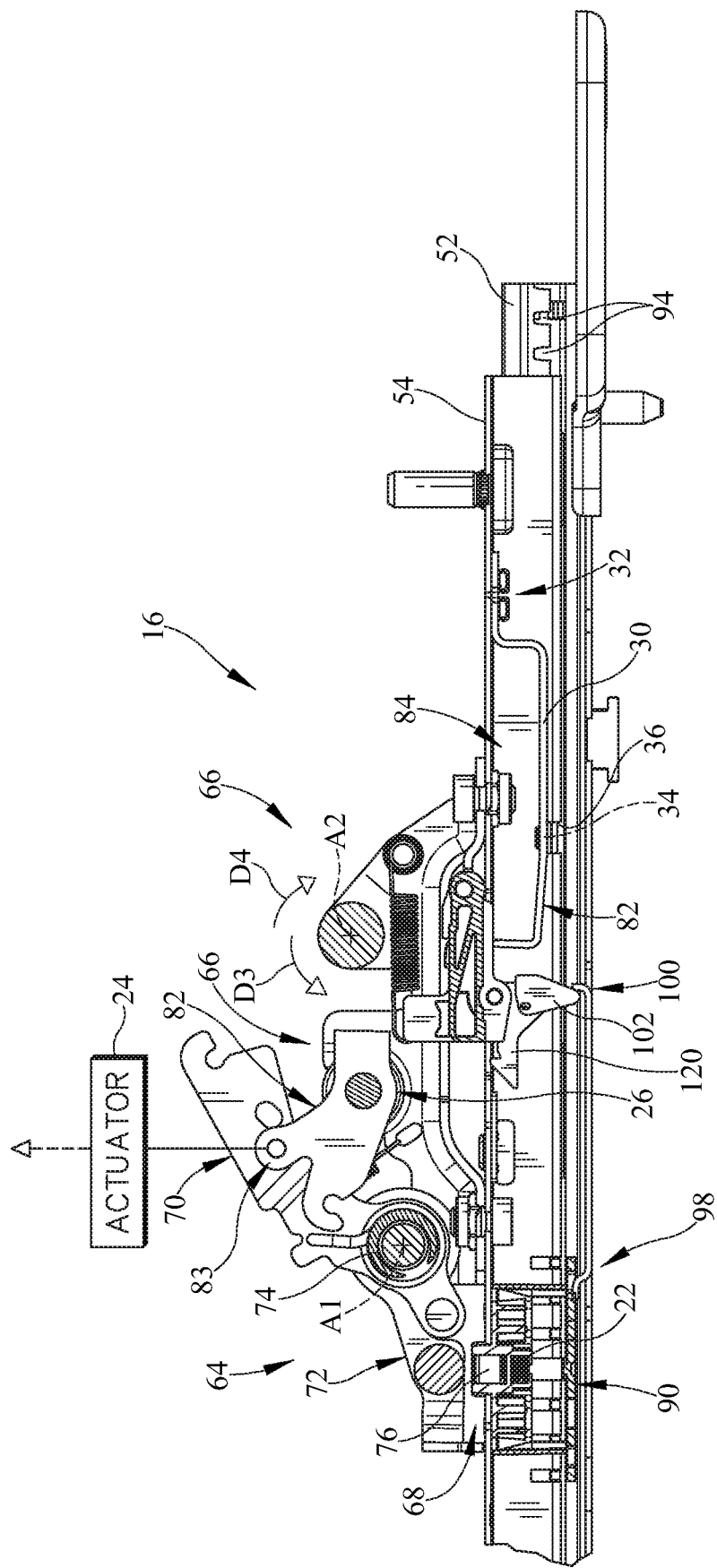
Figure 9:
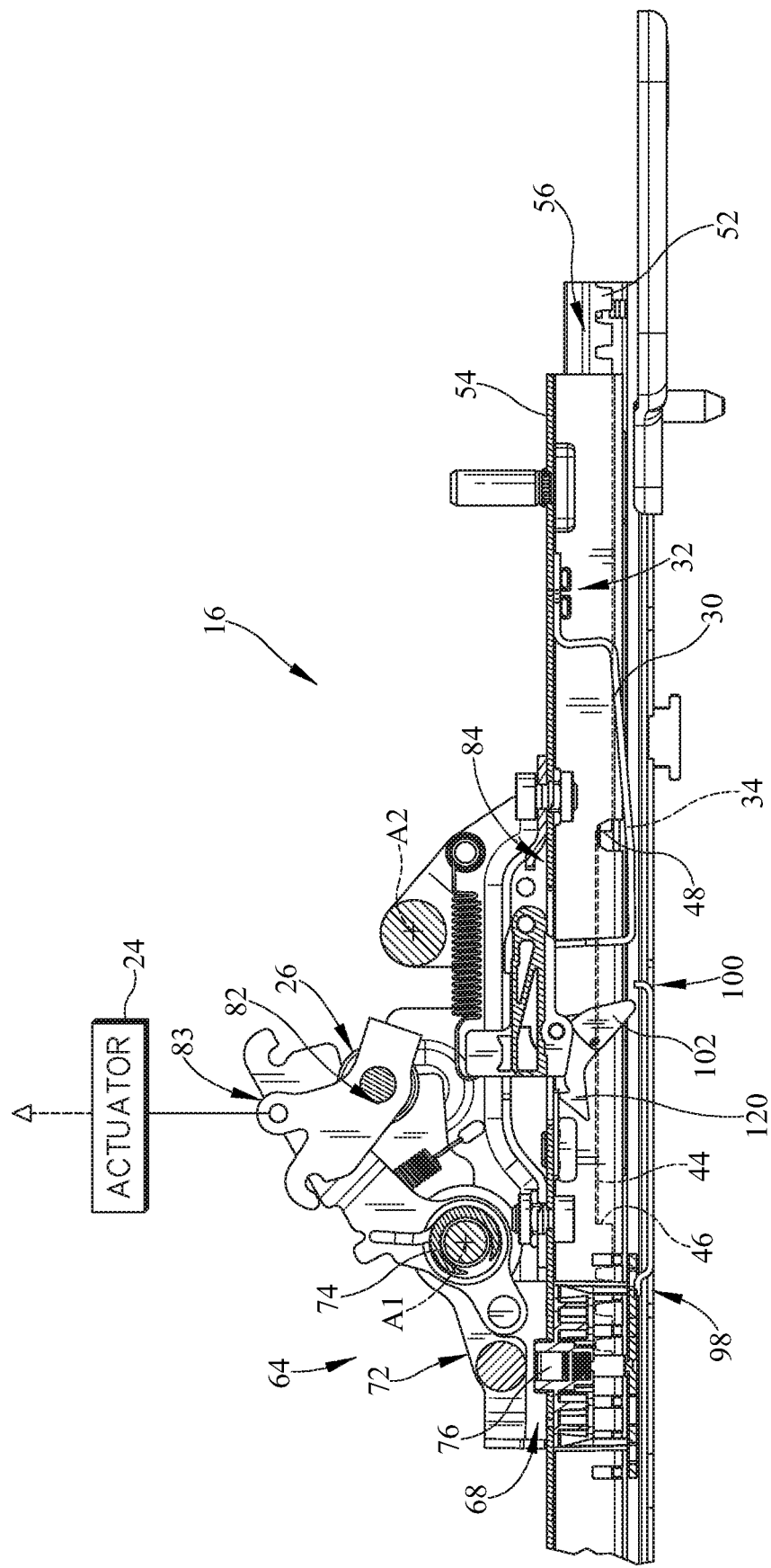
Figure 10:
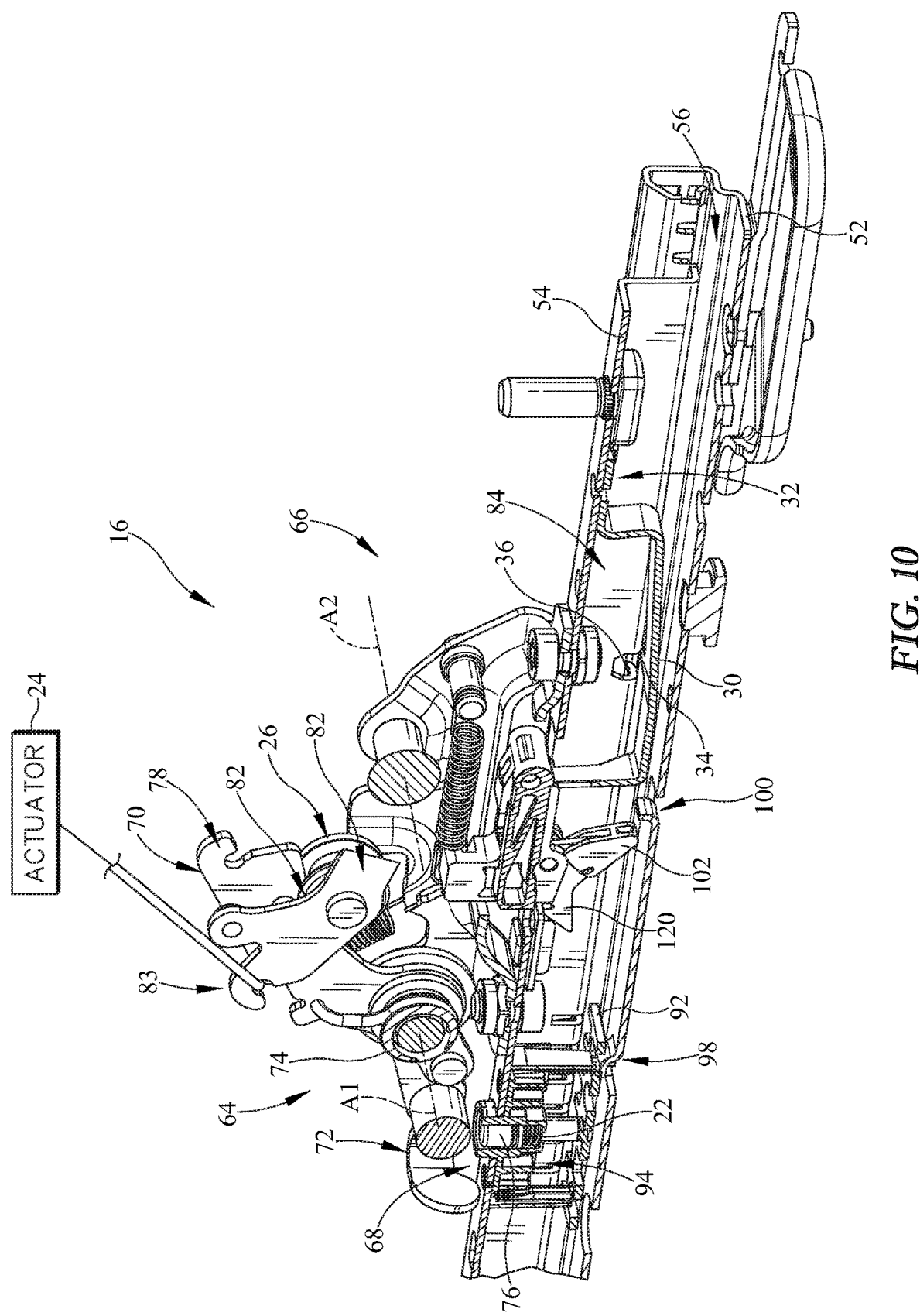
Figure 11:
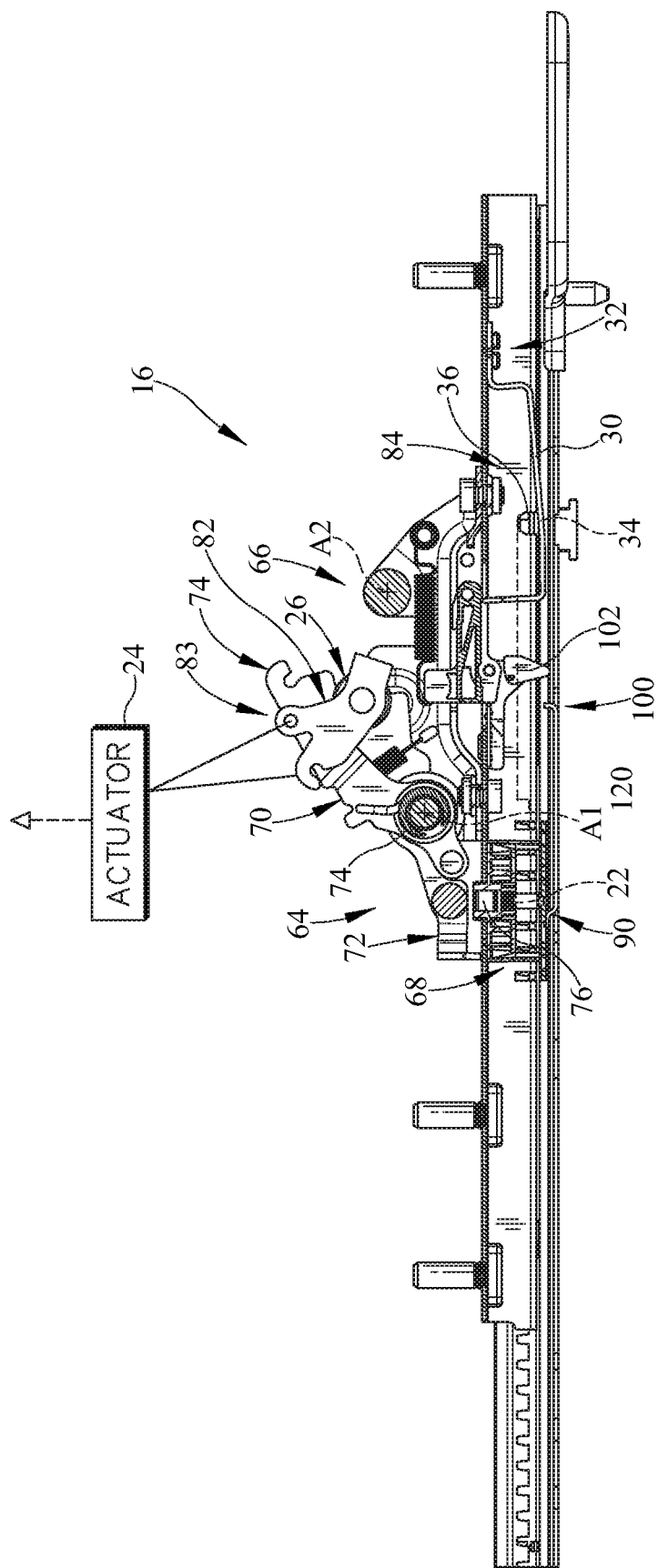
Figure 12:
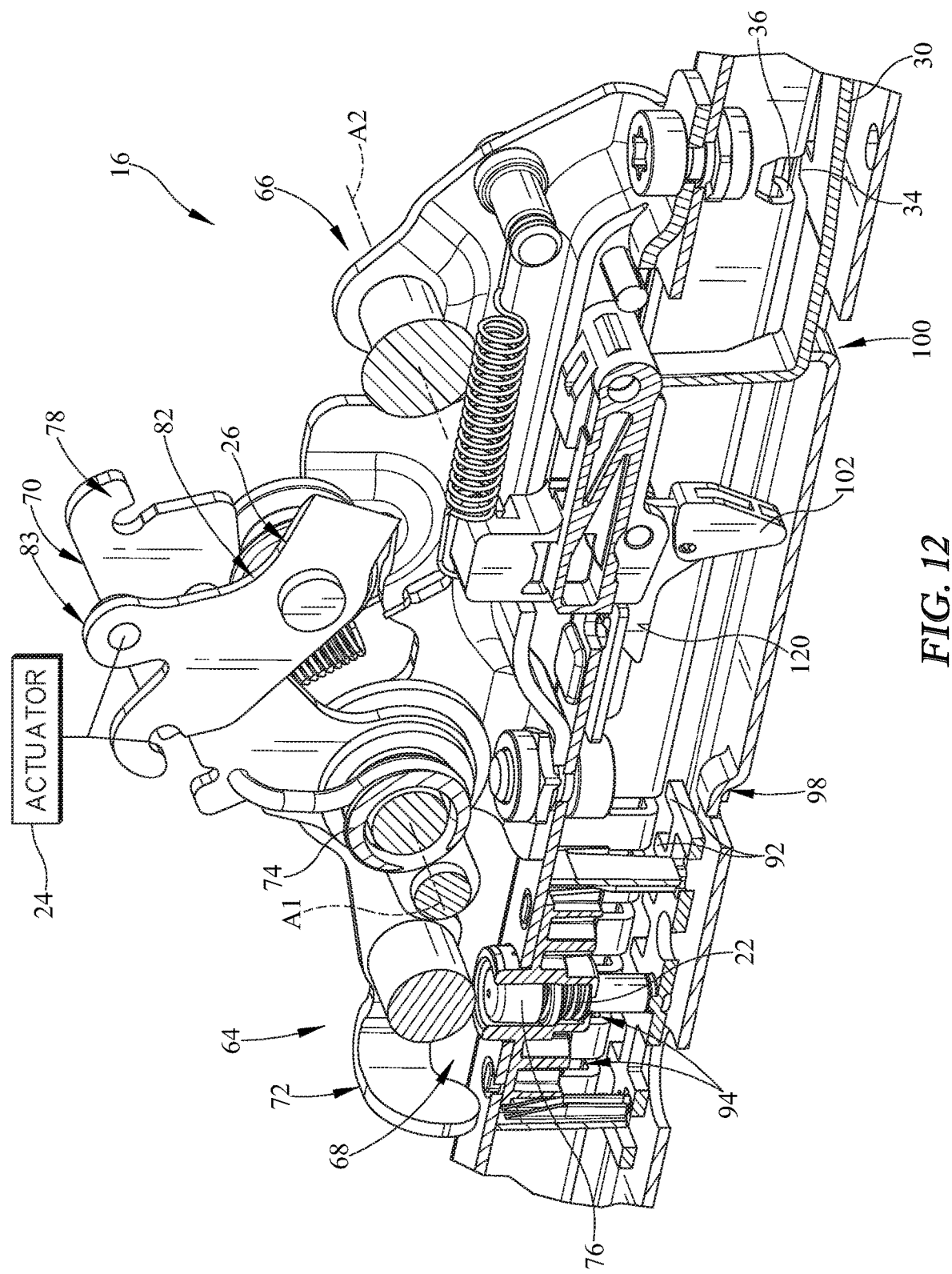
Figure 13:
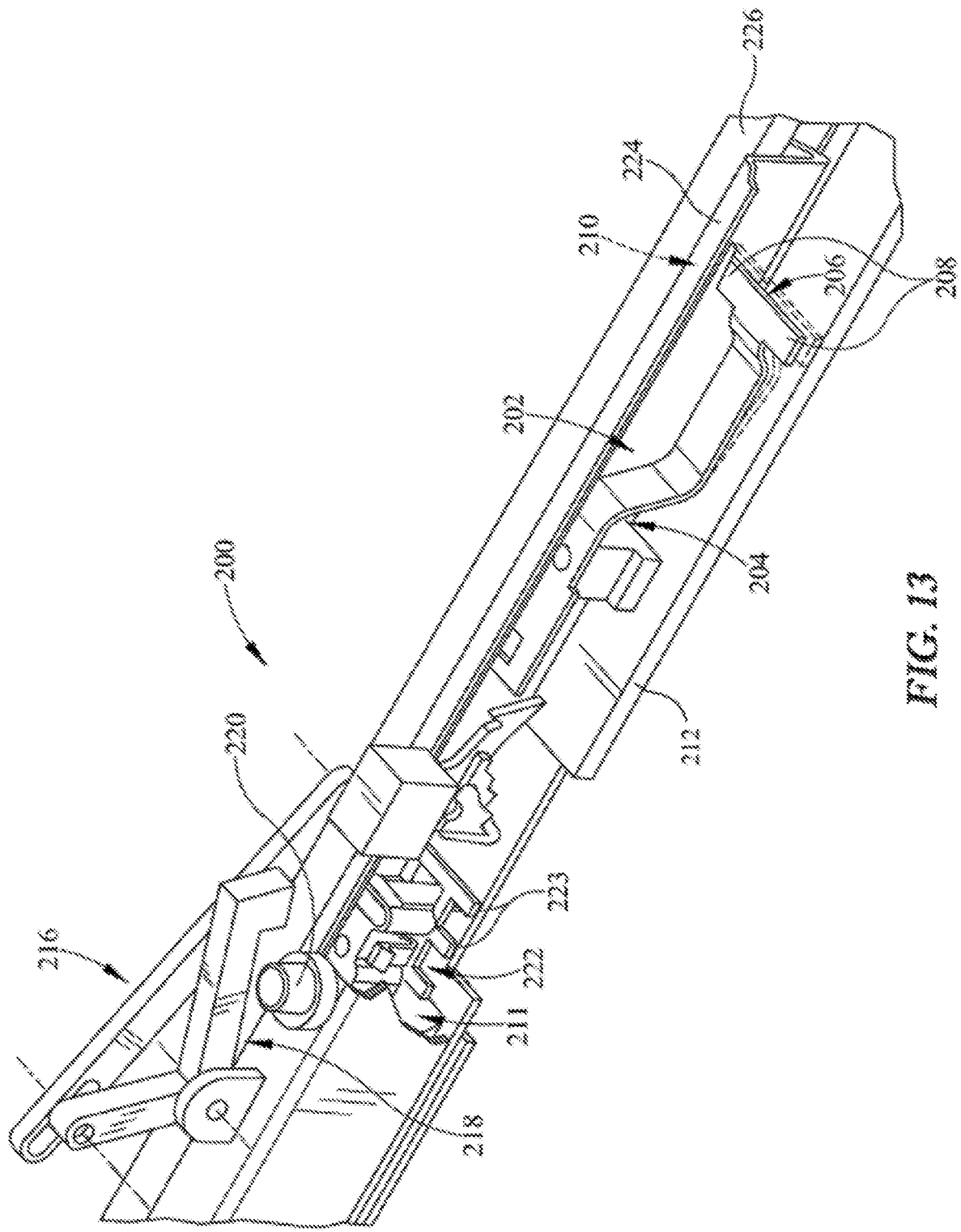
Figure 14:
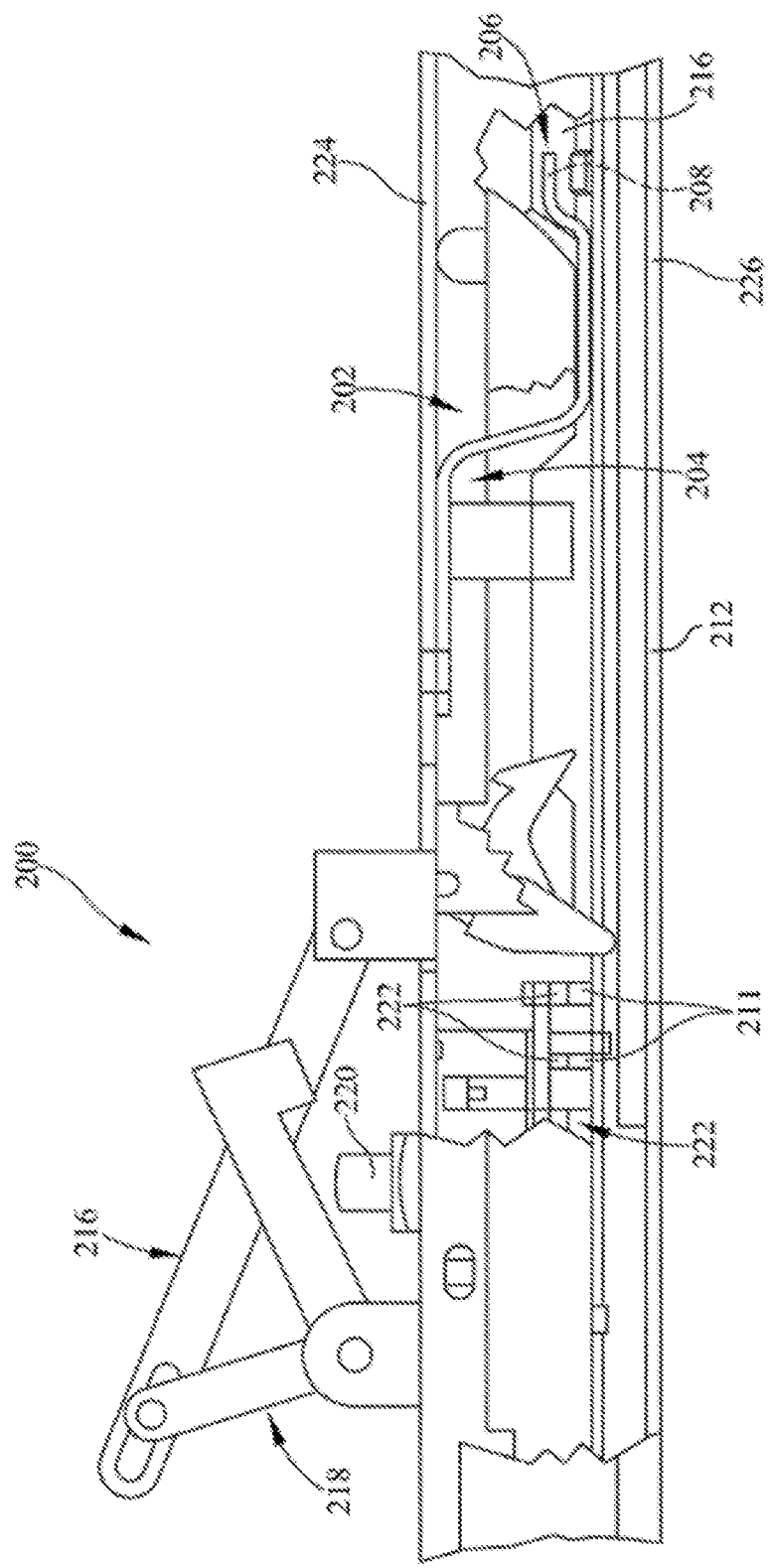
Figure 15:
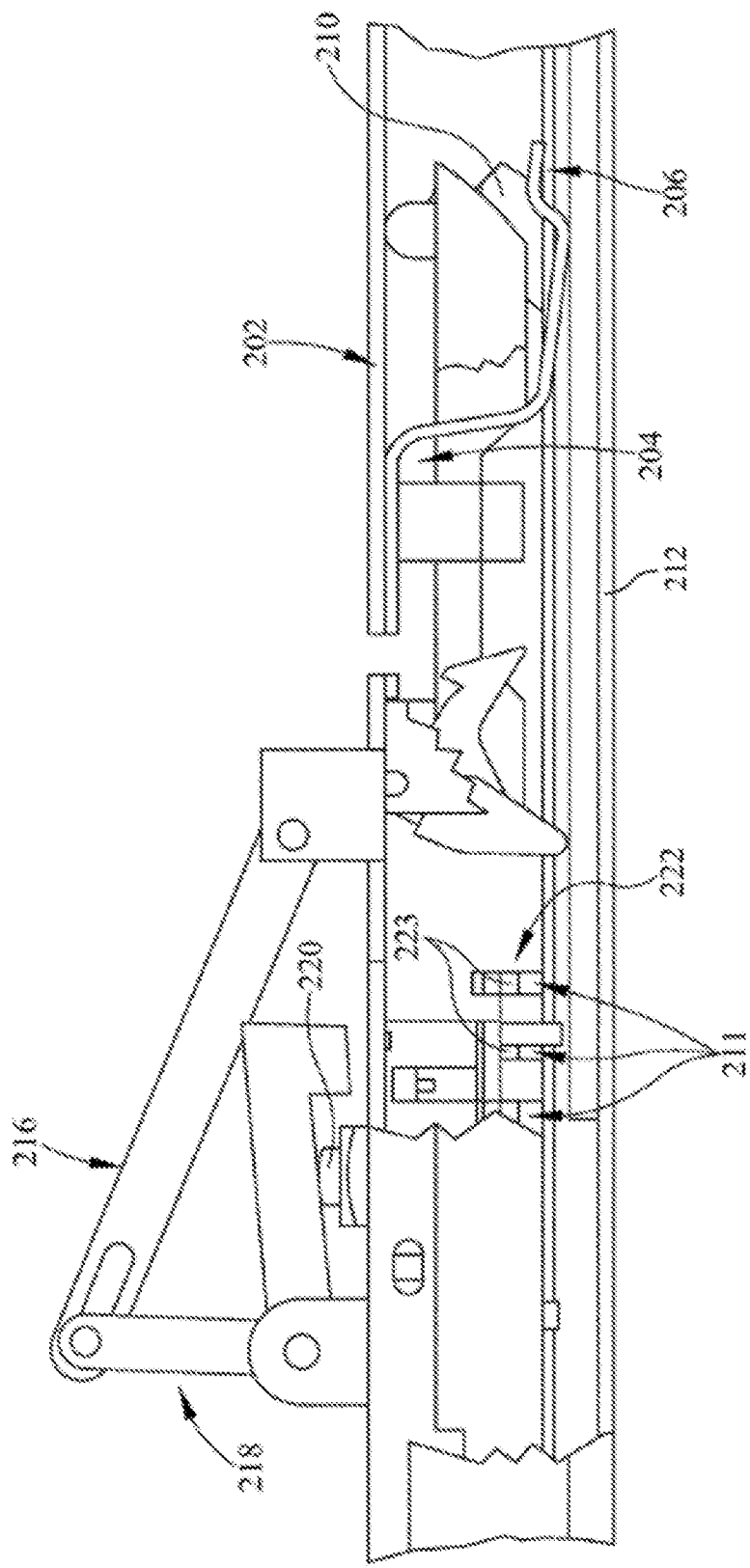

FIG. 7 is a partial perspective view of the latch unit of FIGS. 4-6 with portions broken away to reveal the body of the slide latch is biased downward such that teeth formed on the slide latch are disengaged from slots formed in the lower track so that the upper track is disengaged from the lower track to enable movement of the vehicle seat between the slid-back configuration and the slid-forward configuration;

FIG. 8 is a view similar to FIG. 6 showing the vehicle seat slid forward to the slid-forward configuration suggesting that further forward movement of the vehicle seat is limited as a result of the easy-entry latch unit being the engaged position;

FIG. 9 is a view similar to FIG. 8 showing the easy-entry latch unit moved to the disengaged position causing the comfort latch unit to be or remain in the disengaged position so that the vehicle seat may continue moving forward to the easy-entry configuration;

FIG. 10 is a partial perspective view of the latch unit of FIG. 9 showing that a locking mechanism of the easy-entry latch unit is disengaged from slots formed in both the upper and lower tracks so as to allow the vehicle seat to move to the easy-entry configuration;

FIG. 11 is a view similar to FIG. 9 showing the upper and lower track and latch unit when the vehicle seat is in the easy-entry configuration;

FIG. 12 is a partial perspective view of the latch unit of FIGS. 4-11 showing a locking latch engaging an opening formed on the latch unit so that the stopper is blocked from rotating toward the latch unit when a user attempts to move the vehicle seat from the easy-entry configuration toward the slid-forward arrangement when the easy-entry latch unit is in the disengaged position;

FIG. 13 is a partial perspective view of another embodiment of a latch unit in accordance with the present disclosure showing that the latch unit includes a comfort latch unit to enable movement from the slid-back configuration to the slid-forward configuration and an easy-entry latch unit that enables movement from the slid-forward configuration to the easy-entry configuration;

FIG. 14 is an elevation view of the latch unit of FIG. 13 with portions broken away to reveal the comfort latch unit and the easy-entry latch unit; and FIG. 15 is a view similar to FIG. 14 showing the latch unit moved to cause both the comfort latch unit and the easy-entry latch unit to be engaged to allow the vehicle seat to move between the slid-back configuration, the slid-forward configuration, and the easy-entry configuration.

DETAILED DESCRIPTION

Figure 1:
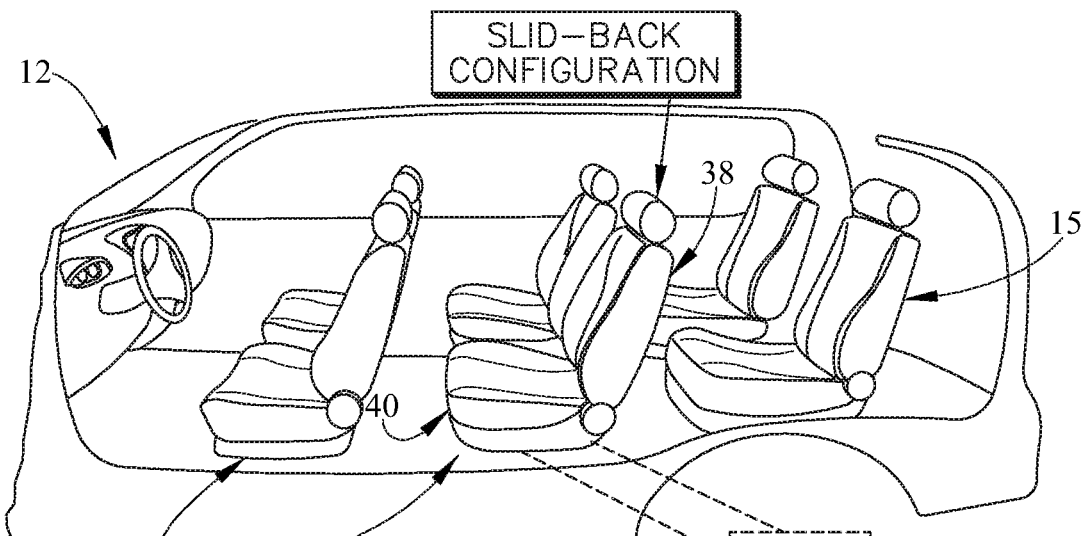
FIG. 1 is a partial perspective view of a vehicle including a middle-row passenger vehicle seat in a slid-back configuration for use by a passenger.
Figure 2:
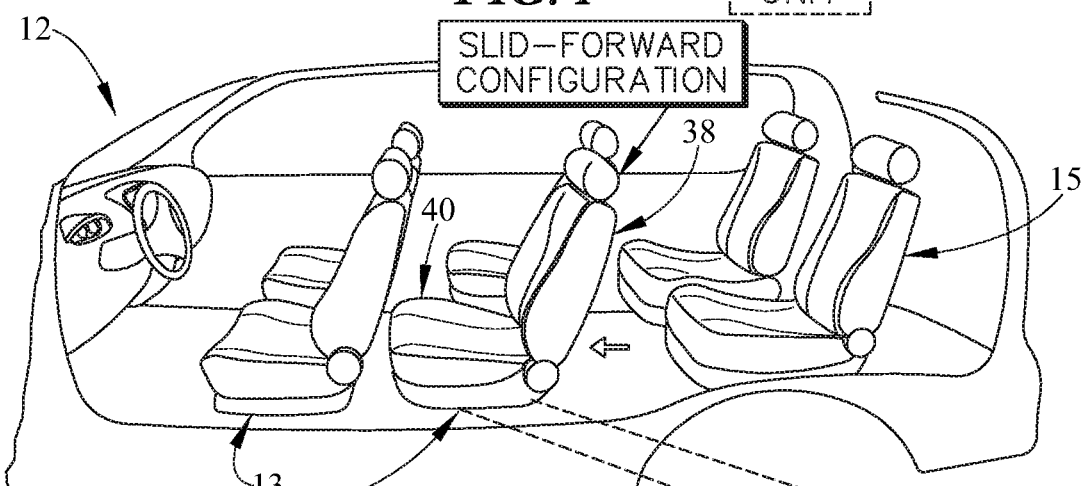
FIG. 2 is a view similar to FIG. 1 showing the middle-row passenger vehicle seat in a slid-forward configuration for use by a passenger.
Figure 3:
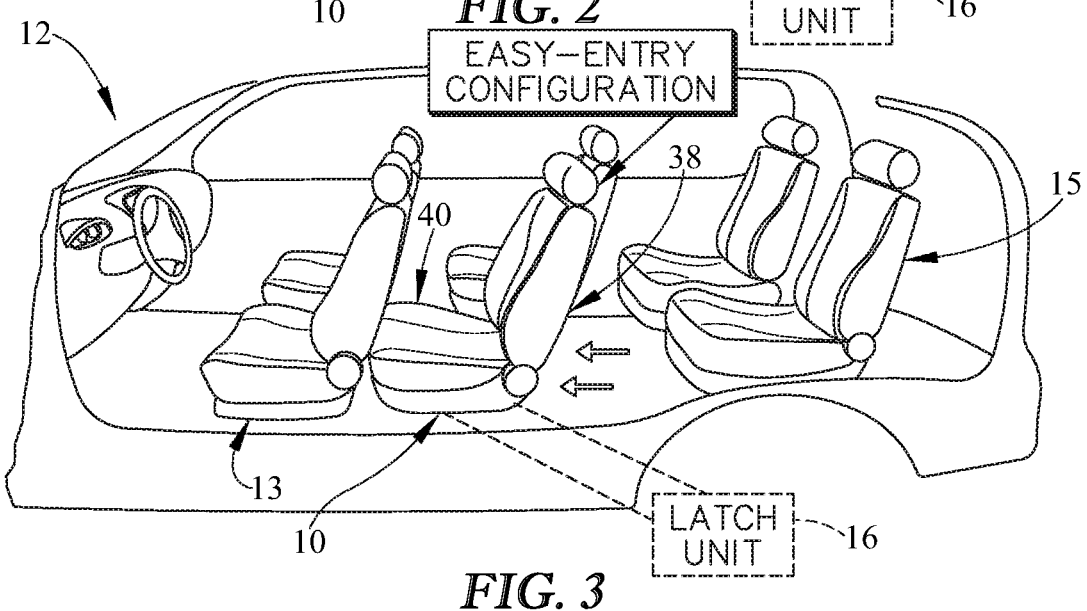
FIG. 3 is a view similar to FIG. 2 showing the middle-row passenger vehicle seat in an easy-entry configuration that enables a passenger to enter a rear-row passenger vehicle seat positioned behind the middle-row passenger seat.

A vehicle 12 includes a set of front-row passenger supports 13, a set of middle-row passenger supports 10, and a set of back-row passenger supports 15 as shown in FIGS. 1-3. The middle-row passenger support 10 includes a vehicle seat 11 and a latch unit 16 as suggested in FIG. 1. In an example of use, the user engages the latch unit 16 to cause the vehicle seat 11 to move between a slid-back passenger-use configuration as shown in FIG. 1, a slid-forward passenger-use configuration as shown in FIG. 2, and an easy-entry configuration as shown in FIG. 3.

The middle-row passenger support 10 includes the vehicle seat 11, a foundation frame 14, and the latch unit 16. The foundation frame 14 is coupled to a floor 17 of the vehicle 12 and the vehicle seat 11 is mounted on the foundation frame 14 as suggested in FIG. 4. The foundation frame 14 interconnects the vehicle seat 11 to the vehicle floor 17 to allow the vehicle seat 11 to slide back and forth between the front-row passenger support 13 and a back-row passenger support 15 as shown in FIGS. 1-3. Vehicle seat 11 moves relative to floor 17 from the slid-back passenger-use configuration shown in FIG. 1 for supporting a passenger during movement of vehicle 12 to the slid-forward passenger-use configuration shown in FIG. 2 for supporting a passenger in a forward position. The vehicle seat 11 may slid further forward to the easy-entry configuration shown in FIG. 3 for easy entry the back-row passenger support 15.

Vehicle seat 11 includes a seat back 38 and a seat bottom 40 that are each movable so that vehicle seat 11 can be reconfigured from the passenger-use configurations to the easy-entry configuration as shown in FIGS. 1-3. Seat back 38 may be coupled to seat bottom 40 for pivotable movement about the seat bottom 40. Seat bottom 40 may be coupled to seat back 38 for pivotable movement about the seat back 38. Seat bottom 40 is coupled to foundation frame 14 between the slid-back configuration, as shown in FIG. 1, and the slid-forward configuration, as shown in FIG. 2, and between the slid-forward configuration and the easy-entry configuration as shown in FIG. 3.

Foundation frame 14 includes a lower track 52 and an upper track 54 as shown in FIGS. 4 and 5. Lower track 52 is coupled to vehicle floor 17 in a fixed position relative to vehicle floor 17. Upper track 54 is coupled to lower track 52 to slide back and forth relative to lower track 52. Upper track 54 moves through a lower-track cannel 56 as suggested in FIGS. 4-12. The latch unit 16 is coupled to the upper track to move therewith and relative thereto. The latch unit 16 engages selectively the lower track 52 to block movement of the upper track 54 relative to the lower track 52.

The latch unit 16 includes a comfort latch unit 64 and an easy-entry latch unit 66 as shown in FIGS. 4 and 5. The comfort latch unit 64 is operable to release the upper track 54 from the lower track 52 so that the vehicle seat 11 moves from the slid-back position to the slid-forward position. The easy-entry latch unit 66 is operable to release the upper track 54 from the lower track 52 so that the vehicle seat 11 moves from the slid-forward position to the easy-entry position. When the easy-entry latch unit 66 is not engaged, the easy-entry latch unit 66 blocks the vehicle seat 11 from moving beyond the slid-forward position and limits movement of the vehicle seat 11 to be only between the slid-forward position and slid-back position or any point therebetween. Only when the easy-entry latch unit 66 and the comfort latch unit 64 are both engaged, may the vehicle seat 11 slide forward beyond the slid-forward position to the easy-entry position.

The comfort latch unit 64 includes a slide latch 68, an upper lever 70, a lower lever 72, and a spring 74. The slide latch 68 is movable between an engaged position in which the slide latch 68 interconnects and blocks sliding movement of the upper track 54 relative to the lower track 52 and a disengaged position in which the upper track 54 is freed to slide relative to the lower track 52. In use, a user causes the slide latch 68 to move between the engaged and disengaged positioned by using an actuator 20 to move the comfort latch unit 64.

Actuator 20 is coupled to a first end 78 of upper lever 70 to cause upper lever 70 to rotate in a direction D1 about an axis A1 driving spring 74 to engage lower lever 72 which causes slide latch 68 to move out of engagement with both the upper track 54 and the lower track 52. Lower lever 72 also rotates about axis A1 in direction D1. As a result, slide latch translates up and down relative to the upper track 54 and the lower track 52 as shown in FIGS. 5-8. Spring 74 biases upper lever 70 and lower lever 72 to rotate in a direction D2 opposite direction D1 when actuator 20 no longer engages upper lever 70.

The slide latch 68 includes a button 76 and a body 90 having a plurality of teeth 92 as shown in FIG. 7. The body 90 is coupled to the button 76 to move therewith and is moved downward when the button 76 is engaged by the lower lever 72. The lower track 52 has a plurality of slots 94 formed therein. The teeth 92 of the slide latch 68 are operable to be received in the slots 94 when the button 76 is not engaged and the body 90 and button 76 are biased upwardly by a spring 22.

In one example, the comfort latch unit 64 allows for vehicle seat 11 to slide back and forth over about 100 mm of travel. The passenger support 10 may pass crash testing when in the slid-forward configuration, the slid-back configuration, or any point therebetween.

The easy-entry latch unit 66 is configured to cooperate with the comfort latch unit 64 to allow the vehicle seat 11 to slide forward beyond the slid-forward configuration to the easy-entry configuration as suggested in FIG. 3. In one example, the easy-entry latch unit 66 permits the vehicle seat to have an additional 170 mm of travel between the slid-forward configuration and the easy-entry configuration. As a result, vehicle seat 11 may have a total travel of about 270 mm between the slid back configuration and the easy-entry configuration.

The easy-entry latch unit 66 includes a lever 82, a roller 26, and a locking mechanism 84 as shown in FIG. 8. The lever 82 includes a first end 83 that is coupled to an actuator device 24, for example, a cable that may be engaged by a user. The lever 82 engages a locking mechanism 84 as suggested in FIG. 8. In one illustrative example, the locking mechanism 84 is a spring or leaf spring. The locking mechanism 84 is coupled to the upper track to move relative thereto in response to movement of lever 82 by actuator device 24. In one example, actuator device 24 causes lever 82 to rotate in a direction D4 about an axis A2. Roller 26 is coupled to lever 82 to move therewith and is located between first end 83 and locking mechanism 84. As roller 26 moves upwardly, roller 26 engages comfort latch unit 64 to move to the disengaged position which allows upper track 54 to slide relative to lower track 52. As lever 82 rotates in Direction D4, a second opposite end 28 of lever 82 engages locking mechanism 84 to move from an engaged position to a disengaged position as shown in FIGS. 8 and 9. A bias spring causes lever 82 to rotate in an opposite direction D3 when actuator device 24 no longer moves lever 82.

Locking mechanism 84 includes a spring 30, a spring mount 32, and a block tab 34 as shown in FIG. 8. Spring 30 is coupled to the upper track 54 by spring mount 32 to cause spring 30 to extend down and longitudinally toward axis A1. Block tabs 34 are coupled to spring 30 and arranged to extend outwardly toward lower track 52. When locking mechanism 84 is in the engaged position, the block tab 34 extends through an upper track slot 36 into a lower track slot 44 as suggested in FIGS. 5 and 9. When locking mechanism 84 is moved to the disengaged position, the spring 30 deflects downwardly causing the block tabs 34 to move therewith and lie in spaced-apart relation to both the upper track slot 36 and lower track slot 44.

When the vehicle seat 11 is only moving between the slid-forward configuration and the slid-back configuration (the easy-entry latch unit 66 is engaged), the block tabs 34 extend into both the lower track slot 44 and the upper track slot 36. The lower track slot 44 has a first end 46 and an opposite second end 48. The block tabs 34 engages the first end 46 of the lower track slot when the vehicle seat is in the slid-back configuration and engages the second end 48 when the vehicle seat is slid-forward configuration. The vehicle seat is limited to traveling between the slid-forward and slid-back configurations so long as the easy-entry latch unit 66 is engaged.

Easy-entry latch unit 66 further includes a stopper 102 which engages a ramp 96 when the vehicle seat is in the slid-forward configuration. This ramp 96 cooperates with block tabs 34 to limit further forward movement of vehicle seat 11 until easy-entry latch unit 66 is moved to the disengaged position.

The ramp 96 includes a rear ramp 98 and a forward ramp 100. In the slid-forward configuration, the slide latch 68 engages the forward ramp 100, thereby stopping additional forward movement. Moreover, a stopper 102 is positioned against the forward ramp 100 further prohibiting forward movement beyond the slid-forward configuration.

As suggested in FIG. 9, the lever 82 of the easy-entry latch unit 66 is engaged. The lever 82 may be engaged at any position between the slid-back configuration and the slid-forward configuration. When the lever 82 is engaged, the lever 82 biases the upper lever 70 of the comfort latch unit 64 to engage the button 76 as described above to release the upper track 54 from the lower track 52. Additionally, the lever 82 engages a locking latch 106, which is biased downward to rotate the stopper 102, thereby enabling movement past the forward ramp 100 when the block tabs 34 are in spaced-apart relation to the lower track slot 44.

Referring to FIG. 12, the locking latch 106 includes a latch 120 coupled to the stopper 102. When the upper track 54 is released from the lower track 52, the latch 120 is secured within an opening 122 formed in the upper track 54. By engaging the opening 63, the latch 120 blocks movement of the stopper 102. Particularly, movement of the stopper 102 is blocked such that the stopper 102 cannot move rear of the ramp 100. As such, for safety, when the traveling between the easy-entry configuration and the slid-forward configuration, the vehicle seat 11 is block from moving back of the slid-forward configuration until the latch 120 is released. By disengaging the easy-entry latch unit 66, the latch 120 is released, thereby enabling movement back to a position between the slid-forward configuration and the slid-back configuration. That is, when the upper track 54 is released from the lower track 52, the vehicle seat 11 cannot be moved back to a position between the slid-back configuration and the slid-forward configuration. This safety feature blocks a passenger from sitting in the vehicle seat 11 while the easy-entry latch unit 66 is engaged to release the upper track 54 from the lower track 52.

Another embodiment of a latch unit 200 in accordance with the present disclosure is shown in FIGS. 13-15. Latch unit 200 is coupled to an upper track 224 that is operable to slide on a lower track 226. The lower track 226 includes a plurality of slots 211 formed therein.

The latch unit 200 is coupled to the upper track 224. The latch unit 200 includes an upper lever 216 that is operable to actuate a locking mechanism 202. The locking mechanism 202 is illustrated as a spring having a first end 204 and a second end 206. The second end 206 includes a tab 208 formed thereon. The tab 208 is operable to engage a slot 210 formed on the lower track 226 as suggested in FIG. 14 to lock the upper track 224 to the lower track 226. Additionally, a locking latch 228 is in operable engagement with the upper lever 216.

The upper lever 216 is further in operable engagement with an unlocking mechanism 218. The unlocking mechanism 218 is operable to engage a button 220 of a slide latch 222. The slide latch 222 includes a plurality of teeth 223 that are operable to engage the slots 211 formed in the lower track 226 to secure the upper track 224 to the lower track 226, as illustrated in FIG. 14.

In operation, the upper lever 216 that is actuated upward to rotate the unlocking mechanism 218 downward. The unlocking mechanism 218 engages the button 220 of the slide latch 222 to disengage the upper track 224 from the lower track 226 in a similar manner as described above. The upper lever 216 simultaneously engages the locking latch 228 that biases the locking mechanism 202 to disengage the tab 208 of the locking mechanism 202 from the slot 210 formed in the inner track 212, as shown in FIG. 15. By disengaging the tab 208 from the slot 210, the upper track 224 to which the latch unit 200 is coupled, is released from the lower track 226, thereby enabling the upper track 224 to move with respect to the lower track 226. Accordingly, actuating the latch unit 200 provides releases the upper track 224 from the lower track 226 to provide movement between the slid-back configuration and the slid-forward configuration. Moreover, the upper track 224 is disengaged from the lower track 226 to enable the vehicle seat 11 to move from the slid-forward configuration to the easy-entry configuration.

The locking latch 228 functions as described with respect to FIG. 12 to provide a safety feature that prohibits the vehicle seat 11 from moving back into a position between the slid-forward configuration and the slid-back configuration when the upper track 224 is disengaged from the lower track 226. Passenger vehicles often include a front-row passenger support, a middle-row passenger support, and a back-row passenger support.

While the passenger support 10 is embodied as a middle-row passenger support, the passenger support 10 may be a front or back row passenger support used anywhere in the vehicle. Furthermore, the passenger support may be used in coupes, sedans, SUV's, or any other suitable alternative.

The following numbered clauses include embodiments that are contemplated and non-limiting:

Clause 1. A passenger support comprising
a foundation frame configured to be coupled to a floor of a vehicle.

Clause 2. The passenger support of any other clause or combination of clauses, the foundation frame including a lower track coupled to the floor in a fixed position relative to the floor and an upper track movable back and forth relative to the lower track.

Clause 3. The passenger support of any other clause or combination of clauses further comprising a vehicle seat coupled to the upper track to move therewith between a slid-back configuration, a slid-forward configuration, and an easy-entry configuration.

Clause 4. The passenger support of any other clause or combination of clauses further comprising a latch unit coupled to the upper track to move therewith and relative thereto and configured to allow selective movement of the vehicle seat between the slid-back configuration, the slid-forward configuration, and the easy-entry configuration.

Clause 5. The passenger support of any other clause or combination of clauses, wherein the latch unit includes a comfort latch unit movable between an engaged position in which the upper track is blocked from moving relative to the lower track and a disengaged position in which the upper track is freed to move relative to the lower track to allow the vehicle seat to move between the slid-back configuration, the slid-forward configuration, and the easy-entry configuration.

Clause 6. The passenger support of any other clause or combination of clauses, wherein the latch unit further includes an easy-entry latch unit movable between an engaged position in which the vehicle seat is movable between the slid-back configuration and the slid-forward configuration when the comfort latch unit is in the disengaged position and a disengaged position in which the vehicle seat is movable to the easy-entry configuration when the comfort latch is in the disengaged position.

Clause 7. The passenger support of any other clause or combination of clauses, wherein the latch unit further includes an easy-entry latch unit movable between an engaged position in which the vehicle seat is movable only between the slid-back configuration and the slid-forward configuration when the comfort latch unit is in the disengaged position and a disengaged position in which the vehicle seat is movable to the easy-entry configuration when the comfort latch is in the disengaged position.

Clause 8. A method of moving a passenger support between a slid-back configuration, a slid-forward configuration, and an easy-entry configuration comprising the steps of actuating a comfort latch unit to disengage an upper track from a lower track to slide a vehicle seat coupled to the upper track between a slid-back configuration and a slid-forward configuration.

Clause 9. The method of any other clause or combination of clauses further comprising the step of actuating an easy-entry latch unit to disengage the upper track from the lower track to slide the vehicle seat between the slid-forward configuration and an easy-entry configuration.

Clause 10. The method of any other clause or combination of clauses, wherein the step of actuating the easy-entry latch unit includes the steps of actuating a lever so that the lever engages a locking mechanism to disengage the locking mechanism from the inner track.

Clause 11. The passenger support of any other clause or combination of clauses, wherein the comfort latch unit is coupled to a first actuator that causes the comfort latch unit to move between the engaged position and the disengaged position in response to application of a force by a user without causing movement of the easy-entry latch unit.

Clause 12. The passenger support of any other clause or combination of clauses, wherein the easy-entry latch unit is coupled to a second actuator that is different than the first actuator that causes both the easy-entry latch unit and the comfort latch unit to move from the engaged positions to the disengaged positions at the same time.

Clause 13. The passenger support of any other clause or combination of clauses, wherein the first actuator is a handle adapted to be grasped by a user and the second actuator is a different handle adapted to be grasped by a user.

Clause 14. The passenger support of any other clause or combination of clauses, wherein the first actuator is a motor.

Clause 15. The passenger support of any other clause or combination of clauses, wherein the second actuator is a motor.

Clause 17. The passenger support of any other clause or combination of clauses, wherein the easy-entry latch unit is coupled to an actuator that causes both the easy-entry latch unit and the comfort latch unit to move from the engaged positions to the disengaged positions at the same time.

Clause 18. The passenger support of any other clause or combination of clauses, wherein the easy-entry latch unit includes a lever movable relative to the upper track and a locking mechanism configured to move between a locked position in which the locking mechanism limits movement of the upper track relative to the lower track and an unlocked position in which the locking mechanism does not limit movement of the upper track relative to the lower track.

Clause 19. The passenger support of any other clause or combination of clauses, wherein the lever is configured to be actuated by a user so that the lever engages the locking mechanism to move the locking mechanism from the locked position to the unlocked position.

Clause 20. The passenger support of any other clause or combination of clauses, wherein the locking mechanism comprises a spring having a first end coupled in a fixed position to the upper the upper rail and a second opposite end configured to be engaged by the lever to move the spring and a block tab coupled to the spring between the first and second ends and arranged to extend laterally away from the spring.

Clause 21. The passenger support of any other clause or combination of clauses, wherein the block tab is arranged to extend through an upper track slot formed in the upper track when the locking mechanism is in the engaged position and the block tab is spaced apart from and located outside the upper track slot when the locking mechanism is in the disengaged position.

Clause 22. The passenger support of any other clause or combination of clauses, wherein the block is arranged to extend through a lower track slot formed in the lower track when the locking mechanism is in the engaged position and the block tab is spaced apart from and located outside the lower track slot when the locking mechanism is in the disengaged position.

Clause 23. The passenger support of any other clause or combination of clauses, wherein the upper track slot has a length and the lower track slot has length greater than a length of the upper track slot.

Clause 24. The passenger support of any other clause or combination of clauses, wherein the block is arranged to extend through a lower track slot formed in the lower track when the locking mechanism is in the engaged position and the block tab is spaced apart from and located outside the lower track slot when the locking mechanism is in the disengaged position.

Clause 25. The passenger support of any other clause or combination of clauses, wherein the comfort latch unit includes an upper lever coupled to the upper track to move relative to the upper track and a lower lever coupled to the upper lever to move relative to the upper track and the upper lever actuated by a user to cause the lower lever allow movement of the upper track relative to the lower track.

Clause 26. The passenger support of any other clause or combination of clauses, further comprising a slide latch including at least one tooth located in a tooth slot formed in the lower track when the comfort latch unit is in the engaged position and located in spaced-apart relation to the tooth slot when the comfort latch unit is in the disengaged position.

Clause 27. The passenger support of any other clause or combination of clauses, further comprising a ramp that engages the upper track to limit movement of the upper track between the slid-back configuration and the slid-forward configuration.

Clause 28. The passenger support of any other clause or combination of clauses, further comprising a locking latch configured to block movement of the vehicle seat from the easy-entry configuration to one of the slid-forward configuration and the slid-back configuration when the easy-entry latch unit is actuated.

Clause 29. The passenger support of any other clause or combination of clauses, wherein the locking latch includes a stopper coupled to the upper rail to move therewith and relative thereto and a latch coupled to the upper rail to move therewith and relative thereto.

Clause 30. The passenger support of any other clause or combination of clauses, wherein the movement of the easy-entry latch unit from the engaged position to the disengaged position causes the stopper and locking latch to translate longitudinally relative to the upper rail.

Clause 31. The passenger support of any other clause or combination of clauses, wherein the locking latch and stopper rotate about an axis during movement of the easy-entry latch unit from the engaged position to the disengaged position.

Clause 32. The passenger support of any other clause or combination of clauses, wherein the stopper is blocked from rotating relative to the upper track in response to engaging a ramp coupled to the lower track in a fixed position relative to the lower track when the easy-entry latch unit is in the disengaged position and the vehicle seat is moving away from the easy-entry configuration.

Clause 33. The passenger support of any other clause or combination of clauses, wherein the latch is arranged to extend through an opening formed in a top wall of the upper track when the easy-entry latch unit is in the disengaged position.

Clause 34. The passenger support of any other clause or combination of clauses, wherein the latch is rotates about the axis during movement of the easy-entry latch unit from the engaged position to the disengaged position to lie below and spaced apart from the opening.

Clause 35. The method of any other clause or combination of clauses, wherein the locking mechanism comprises a spring having a first end and a second end, wherein the step of actuating the easy-entry latch unit includes the step of actuating the lever so that the first end is engaged by the lever and a tab coupled to the spring between the first and second ends moves out of a slot formed in the lower track.

Clause 36. The method of any other clause or combination of clauses, wherein the locking mechanism comprises a spring having a first end and a second end, wherein the step of actuating the easy-entry latch unit includes the step of actuating the lever so that the first end is engaged by the lever and a tab coupled to the spring to move therewith moves out of a slot formed in the lower track.

Clause 37. The method of any other clause or combination of clauses, wherein the step of actuating the comfort latch unit includes the step of actuating an upper lever so that a lower lever disengages the upper track from the lower track.

Clause 38. The method of any other clause or combination of clauses, wherein the step of actuating the comfort latch unit further comprises the step of pulling a cable coupled to the upper lever to actuate the upper lever.

Clause 39. The method of any other clause or combination of clauses, wherein the comfort latch unit includes a slide latch and the step of actuating the comfort latch unit includes the step of actuating a slide latch to disengage at least one tooth of the slide latch from a slot of the lower track.

Clause 40. The method of any other clause or combination of clauses, wherein actuating the easy-entry latch unit step causes the actuating the comfort latch unit step to occur at the same time.

Clause 41. The method of any other clause or combination of clauses, further comprising the step of limiting movement of the upper track between the slid-back configuration and the slid-forward configuration with a ramp.

Clause 42. The method of any other clause or combination of clauses, further comprising the step of actuating the easy-entry latch unit so that the outer track of the upper track by-passes the ramp.

Clause 43. The method of any other clause or combination of clauses, further comprising the step of limiting movement of the vehicle seat to the slid-back configuration when the easy-entry latch unit is actuated.

The invention claimed is:

1. A passenger support comprising
a foundation frame configured to be coupled to a floor of a vehicle, the foundation frame including a lower track coupled to the floor in a fixed position relative to the floor and an upper track movable back and forth relative to the lower track,
a vehicle seat coupled to the upper track to move therewith between a slid-back configuration, a slid-forward configuration, and an easy-entry configuration,
a latch unit coupled to the upper track to move therewith and relative thereto and configured to allow selective movement of the vehicle seat between the slid-back configuration, the slid-forward configuration, and the easy-entry configuration,
wherein the latch unit includes a comfort latch unit movable between a comfort latch engaged position in which the upper track is blocked from moving relative to the lower track and a comfort latch disengaged position in which the upper track is freed to move relative to the lower track to allow the vehicle seat to move between the slid-back configuration, the slid-forward configuration, and the easy-entry configuration and an easy-entry latch unit movable between an easy-entry latch engaged position in which the vehicle seat is movable between the slid-back configuration and the slid-forward configuration when the comfort latch unit is in the comfort latch disengaged position and an easy-entry latch disengaged position in which the vehicle seat is movable to the easy-entry configuration when the comfort latch is in the comfort latch disengaged position,
wherein the easy-entry latch unit is coupled to an actuator that causes both the easy-entry latch unit and the comfort latch unit to move from the engaged positions to the disengaged positions at same time.

2. The passenger support of claim 1, wherein the comfort latch unit is coupled to a first actuator that causes the comfort latch unit to move between the engaged position and the disengaged position in response to application of a force by a user without causing movement of the easy-entry latch unit.

3. The passenger support of claim 2, wherein the easy-entry latch unit is coupled to a second actuator that is different than the first actuator that causes both the easy-entry latch unit and the comfort latch unit to move from the engaged positions to the disengaged positions at the same time.

4. The passenger support of claim 3, wherein the first actuator is a handle adapted to be grasped by a user and the second actuator is a different handle adapted to be grasped by a user.

5. The passenger support of claim 3, wherein the first actuator is a motor and the second actuator is a motor.

6. The passenger support of claim 1, wherein the easy-entry latch unit includes a lever movable relative to the upper track and a locking mechanism configured to move between a locked position in which the locking mechanism limits movement of the upper track relative to the lower track and an unlocked position in which the locking mechanism does not limit movement of the upper track relative to the lower track.

7. The passenger support of claim 6, wherein the lever is configured to be actuated by a user so that the lever engages the locking mechanism to move the locking mechanism from the locked position to the unlocked position.

8. A passenger support comprising
a foundation frame configured to be coupled to a floor of a vehicle, the foundation frame including a lower track coupled to the floor in a fixed position relative to the floor and an upper track movable back and forth relative to the lower track,
a vehicle seat coupled to the upper track to move therewith between a slid-back configuration, a slid-forward configuration, and an easy-entry configuration,
a latch unit coupled to the upper track to move therewith and relative thereto and configured to allow selective movement of the vehicle seat between the slid-back configuration, the slid-forward configuration, and the easy-entry configuration,
wherein the latch unit includes a comfort latch unit movable between a comfort latch engaged position in which the upper track is blocked from moving relative to the lower track and a comfort latch disengaged position in which the upper track is freed to move relative to the lower track to allow the vehicle seat to move between the slid-back configuration, the slid-forward configuration, and the easy-entry configuration and an easy-entry latch unit movable between an easy-entry latch engaged position in which the vehicle seat is movable between the slid-back configuration and the slid-forward configuration when the comfort latch unit is in the comfort latch disengaged position and an easy-entry latch disengaged position in which the vehicle seat is movable to the easy-entry configuration when the comfort latch is in the comfort latch disengaged position,
wherein the easy-entry latch unit includes a lever movable relative to the upper track and a locking mechanism configured to move between a locked position in which the locking mechanism limits movement of the upper track relative to the lower track and an unlocked position in which the locking mechanism does not limit movement of the upper track relative to the lower track,
wherein the locking mechanism comprises a spring having a first end coupled in a fixed position to the upper rail and a second opposite end configured to be engaged by the lever to move the spring and a block tab coupled to the spring between the first and second ends and arranged to extend laterally away from the spring.

9. The passenger support of claim 8, wherein the block is arranged to extend through a lower track slot formed in the lower track when the locking mechanism is in the engaged position and the block tab is spaced apart from and located outside the lower track slot when the locking mechanism is in the disengaged position.

10. The passenger support of claim 8, wherein the block tab is arranged to extend through an upper track slot formed in the upper track when the locking mechanism is in the engaged position and the block tab is spaced apart from and located outside the upper track slot when the locking mechanism is in the disengaged position.

11. The passenger support of claim 10, wherein the block is arranged to extend through a lower track slot formed in the lower track when the locking mechanism is in the engaged position and the block tab is spaced apart from and located outside the lower track slot when the locking mechanism is in the disengaged position.

12. The passenger support of claim 11, wherein the upper track slot has a length and the lower track slot has length greater than a length of the upper track slot.

13. A passenger support comprising
a foundation frame configured to be coupled to a floor of a vehicle, the foundation frame including a lower track coupled to the floor in a fixed position relative to the floor and an upper track movable back and forth relative to the lower track,
a vehicle seat coupled to the upper track to move therewith between a slid-back configuration, a slid-forward configuration, and an easy-entry configuration,
a latch unit coupled to the upper track to move therewith and relative thereto and configured to allow selective movement of the vehicle seat between the slid-back configuration, the slid-forward configuration, and the easy-entry configuration,
wherein the latch unit includes a comfort latch unit movable between a comfort latch engaged position in which the upper track is blocked from moving relative to the lower track and a comfort latch disengaged position in which the upper track is freed to move relative to the lower track to allow the vehicle seat to move between the slid-back configuration, the slid-forward configuration, and the easy-entry configuration and an easy-entry latch unit movable between an easy-entry latch engaged position in which the vehicle seat is movable between the slid-back configuration and the slid-forward configuration when the comfort latch unit is in the comfort latch disengaged position and an easy-entry latch disengaged position in which the vehicle seat is movable to the easy-entry configuration when the comfort latch is in the disengaged position,
further comprising a locking latch configured to block movement of the vehicle seat from the easy-entry configuration to one of the slid-forward configuration and the slid-back configuration when the easy-entry latch unit is actuated.

14. The passenger support of claim 13, wherein the locking latch includes a stopper coupled to the upper rail to move therewith and relative thereto and a latch coupled to the upper rail to move therewith and relative thereto.

15. The passenger support of claim 14, wherein the movement of the easy-entry latch unit from the engaged position to the disengaged position causes the stopper and locking latch to translate longitudinally relative to the upper rail.

16. The passenger support of claim 15, wherein the locking latch and stopper rotate about an axis during movement of the easy-entry latch unit from the engaged position to the disengaged position.

17. The passenger support of claim 16, wherein the stopper is blocked from rotating relative to the upper track in response to engaging a ramp coupled to the lower track in a fixed position relative to the lower track when the easy-entry latch unit is in the disengaged position and the vehicle seat is moving away from the easy-entry configuration.

18. The passenger support of claim 16, wherein the latch is arranged to extend through an opening formed in a top wall of the upper track when the easy-entry latch unit is in the disengaged position.

19. The passenger support of claim 18, wherein the latch is rotates about the axis during movement of the easy-entry latch unit from the engaged position to the disengaged position to lie below and spaced apart from the opening.

* * * * *